United States Patent
Baele et al.

(10) Patent No.: US 9,578,310 B2
(45) Date of Patent: Feb. 21, 2017

(54) AUTOMATIC SCENE CALIBRATION

(71) Applicant: SOFTKINETIC SOFTWARE, Brussels (BE)

(72) Inventors: Xavier Baele, Brussels (BE); Javier Martinez Gonzalez, Brussels (BE)

(73) Assignee: SoftKinetic Software, Brussels (BE)

( * ) Notice: Subject to any disclaimer, the term of this patent is extended or adjusted under 35 U.S.C. 154(b) by 195 days.

(21) Appl. No.: 14/130,256

(22) PCT Filed: Jan. 14, 2013

(86) PCT No.: PCT/EP2013/050597
§ 371 (c)(1),
(2) Date: Dec. 30, 2013

(87) PCT Pub. No.: WO2013/104800
PCT Pub. Date: Jul. 18, 2013

(65) Prior Publication Data
US 2015/0181198 A1    Jun. 25, 2015

(30) Foreign Application Priority Data
Jan. 13, 2012   (EP) .................................... 12000202

(51) Int. Cl.
*H04N 13/02* (2006.01)
*G06T 7/00* (2006.01)

(52) U.S. Cl.
CPC ......... *H04N 13/0246* (2013.01); *G06T 7/002* (2013.01); *G06T 7/0018* (2013.01); *G06T 7/0051* (2013.01); *G06T 2207/30244* (2013.01)

(58) Field of Classification Search
CPC .................................................. H04N 13/0246
(Continued)

(56) References Cited

U.S. PATENT DOCUMENTS 7,106,898 B2 *  9/2006  Bouguet .......... G01B 11/2518
                                                   382/154
7,456,842 B2 * 11/2008  Kosolapov ........ G01B 11/2509
                                                   345/549
(Continued)

FOREIGN PATENT DOCUMENTS

JP     H11175762       7/1999
JP     2001317915     11/2001
(Continued)

OTHER PUBLICATIONS

Vision and Inertial Sensor Cooperation using gravity as a vertical reference. Dias J Dec. 2003.*
(Continued)

*Primary Examiner* — William C Vaughn, Jr.
*Assistant Examiner* — Luis Perez Fuentes
(74) *Attorney, Agent, or Firm* — Wolf, Greenfield & Sacks, P.C.

(57) ABSTRACT

Described herein is a method of calibrating a three-dimensional imaging system. During calibration, a position and an orientation of the three-dimensional imaging system is determined with respect to a first parameter comprising a real world vertical direction ($V_w$) and to a second parameter comprising an origin of a three-dimensional scene captured by the imaging system. The first and second parameters are used to derive a calibration matrix ($M_{C2w}$) which is used to convert measurements from a virtual coordinate system ($M_c$) of the three-dimensional imaging system into a real coordinate system ($M_w$) related to the real world. The calibration matrix ($M_{C2w}$) is used to rectify measurements prior to signal processing. An inverse calibration matrix ($M_{w2c}$) is also determined. Continuous monitoring and adjustment of the setup of the three-dimensional imaging
(Continued)

system is carried out and the calibration matrix ($M_{c2w}$) and its inverse ($M_{w2c}$) are adjusted accordingly.

15 Claims, 5 Drawing Sheets

(58) Field of Classification Search
USPC .......................................................... 348/46
See application file for complete search history.

(56) References Cited

U.S. PATENT DOCUMENTS

| | | | | |
|---|---|---|---|---|
| 8,264,546 B2* | 9/2012 | Witt | ...................... | G06T 7/0044 |
| | | | | 348/187 |
| 8,462,357 B2* | 6/2013 | Rodrigue | ............. | G01B 11/245 |
| | | | | 356/601 |
| 8,872,925 B2* | 10/2014 | Xie | ...................... | G06T 7/0018 |
| | | | | 348/135 |
| 8,947,511 B2* | 2/2015 | Friedman | ........... | H04N 13/0022 |
| | | | | 348/51 |
| 9,124,873 B2* | 9/2015 | Liu | ..................... | H04N 13/0203 |
| 2007/0032950 A1* | 2/2007 | O'Flanagan | ............ | G01S 19/47 |
| | | | | 701/472 |
| 2010/0053322 A1* | 3/2010 | Marti | ...................... | G06F 3/011 |
| | | | | 348/135 |
| 2011/0205340 A1* | 8/2011 | Garcia | .................. | G01S 7/4972 |
| | | | | 348/46 |
| 2011/0228103 A1* | 9/2011 | Takemoto | ............. | G06T 7/0018 |
| | | | | 348/187 |
| 2015/0181198 A1* | 6/2015 | Baele | .................... | G06T 7/0018 |
| | | | | 348/46 |

FOREIGN PATENT DOCUMENTS

| | | |
|---|---|---|
| JP | 2004108836 | 4/2004 |
| JP | 2007025863 | 2/2007 |
| JP | 2009042162 | 2/2009 |
| JP | 2009210331 | 9/2009 |
| JP | 2011215082 | 10/2011 |
| JP | 2011530706 | 12/2011 |

OTHER PUBLICATIONS

Vision and Inertial Sensor Cooperation using gravity as a vertical reference. Dias J.*
Office Action from corresponding Japanese Patent Appl. No. 2014-523349, dated Nov. 6, 2014.

* cited by examiner

AUTOMATIC SCENE CALIBRATION

FIELD OF THE INVENTION

The present invention relates to camera calibration and is more particularly concerned with automatically calibrating the position and orientation of a Three-dimensional (3D) sensing camera with respect to the real world.

BACKGROUND TO THE INVENTION

Three-dimensional (3D) or depth sensing cameras, namely, structured light 3D cameras, time-of-flight 3D cameras, and stereo-vision 3D cameras, are imaging devices that acquire depth images. A depth image represents distances from the scene to the 3D. 3D camera devices, and the depth images they provide, are used to analyse static and dynamic 3D elements within a captured scene, such as, objects and users.

Analysis of a captured scene may include detection, localisation, and identification of objects and/or users and their respective analysis. One common problem which occurs during such analysis is the unknown orientation of the camera. For example, a vertically-oriented object in the scene may appear to be horizontal in the depth image if the camera is rotated by 90 degrees clock- or counter-clockwise around its optical axis. It is therefore advantageous to know the parameters relating to the camera so that better results can be obtained when analysing a captured scene.

Camera calibration is the process in which the true parameters of the camera are determined. These true camera parameters are usually used as correction parameters and may, for most part, be represented by a linear transformation, namely, a camera calibration matrix which can be used, for example, to denote a projective mapping from the real world coordinate system to a camera coordinate system for that particular camera.

Camera parameters include intrinsic and extrinsic parameters, and these are widely addressed in the literature, for example, in "A Four-step Camera Calibration Procedure with Implicit Image Correction" by Janne Heikkila, or in "Calibration Method for an Augmented Reality System" by S. Malek et al.

Intrinsic parameters encompass imaging device optical specifications, such as, image format, principal point and focal length. They may be modelled and integrated in a transformation matrix applied to data related to the camera coordinate system in order to correct some potential distortions during scene capture. Lens distortion may also be taken into account as a non-intrinsic parameter, but will not be directly incorporated in the transformation matrix as it is a non-linear transformation.

Extrinsic parameters encompass 3D position and 3D orientation of the camera relative to a world coordinate system. A camera coordinate system is associated with the camera and a transformation matrix is defined in order to provide projection of data measurements from the camera coordinate system to the world coordinate system.

By considering a 3D camera as a simple pin-hole, extrinsic parameters may be the only relevant parameters that need to be determined and applied to provide a convenient correction and/or transformation.

In order to find extrinsic parameters, camera vertical, lateral and longitudinal axes, respectively yaw, pitch and roll axes have to be considered as they define the camera coordinate system. More precisely, the yaw axis is an axis drawn from top to bottom of the camera, and perpendicular to the other two axes. The pitch axis is an axis running from the camera left to right, and parallel to a Y-axis of the camera sensor. The roll axis is an axis drawn in the normal direction of the camera body from back to front along its optical axis. Basically, the camera coordinate system origin is located on the sensor chip, for example, at the top left corner of the sensor chip or the centre of the sensor chip. This is described in more detail below with reference to FIG. 6.

In addition, the camera position within the scene needs to be considered. This position needs to be estimated by finding or defining a reference point in the scene, the reference point being set as the origin of the real world coordinate system.

Several methods for calibrating cameras are known. Most of these methods concern two-dimensional (2D) cameras, and a few concern three-dimensional (3D) cameras. Furthermore, calibration is most often performed off-line, and not in real-time, on a static camera. Markers located in the scene may also be used to help the calibration process. Such a calibration process often includes several steps and requires user interaction.

In addition, these methods tend not to correct for all possible orientations of the 3D camera, and, they are often limited to being used with cameras in specific orientations, for example, generally downwardly- or generally horizontally-oriented cameras.

US-A-2010/0208057 discloses a method of determining the pose of a camera with respect to at least one object in a real environment. The method includes analysing a captured image of the object to determine distance data relating to the location of the camera with respect to the object and orientation data, the distance data and orientation data being used to provide pose information relating to the camera.

In an article entitled "Vision and Inertial Sensor Cooperation Using Gravity as a Vertical Reference" by Jorge Lobo and Jorge Dias, IEEE Transactions on Pattern Analysis and Machine Intelligence, Vol. 25, No. 12, December 2003, a method is described for using inertial sensor data in sensor systems. Vanishing points and vanishing lines are used with the inertial sensor data to determine a ground plane from which a mapping between ground plane points and image points can be derived.

Vieville et al. in "Computation of ego-motion and structure from Visual and Inertial Sensors Using the Vertical Cue", describe a method of recovery of three-dimensional data structure and motion of a scene using visual and odometric sensors by building a three-dimensional depth and kinematic map of the environment. A vertical in the image is used to align with the true orientation three-dimensional vertical.

US-A-2010/0103275 describes a still 2D digital camera with integrated accelerometers in which roll and pitch and variations are measured and used as an input so that the displayed image is corrected and aligned with conventional horizontal and vertical display device directions. The method described only applies to variations to the horizontal and/or vertical camera axis so as to allow switching between landscape and portrait modes.

WO-A-2010/082933 describes a system where markers or objects in an image of a scene are aligned with corresponding markers or objects in the original scene in order to perform a geometric camera calibration. Camera parameters are thus determined by a method which analyses mismatch between target model and the target itself.

US-2011/0128388 discloses a camera calibration system including a coordinate data generation device and a coordinate data recognition device. The coordinate data generation device generates a plurality of map coordinate data corresponding to a plurality of real positions in a real scene. The coordinate data recognition device receives an image of the real scene and the map coordinate data from the coordinate data generation device. It determines image positions corresponding to real positions and then calculates image coordinate data corresponding to those image positions. From the image coordinate data and the map coordinate data, a coordinate transform matrix is determined.

EP-A-2154650 describes a method of real-time or near real-time calculation of scene coordinates from image data acquired by a 3D camera using a transformation matrix from the camera coordinate system to the world coordinate system. The method relies on detecting one or more planar surfaces within an acquired 3D image, selecting one of these planar surfaces as being a reference plane, for example, the ground. The position, roll and pitch orientation parameters of the 3D camera are then determined in relation to the selected reference plane. Such calibration is carried out by executing a few steps with a limited amount of human intervention once the 3D camera is installed in its proper position, that is, the floor has to be in the frustum of the camera and seen by the camera so that a random sample consensus (RANSAC) based plane detection can be used to detect it. Once the calibration matrix is set, it is then used until the camera setup changes. At that time, a new calibration process has to be launched manually.

SUMMARY OF THE INVENTION

The present invention is related to the calibration of depth sensing camera devices with respect to their extrinsic parameters, for example, the position and the orientation of the camera in relation to a scene. This calibration provides calibration matrix.

One aim of the present invention is to facilitate the calibration of installations which may include a dynamic aspect, such as, position and orientation of a camera with respect to the scene which may vary over the time. This is in addition to fixed installations where both the position and orientation of the camera do not vary over time.

Additionally, a calibration process can be started when any change is detected in extrinsic camera parameters. Such a calibration process can be used to update a previously determined calibration matrix.

It is therefore an object of the present invention to provide a method that provides for an automatic determination of the orientation and the position of a camera within a scene.

It is another object of the present invention to provide a method that provides for calibration of a camera without human manipulation.

It is another object of the invention to provide a method for determining a transformation that allows for the application of forward and reverse data measurement expressed in the camera or virtual coordinate system into data expressed in the world or real coordinate system.

It is a further object of the invention to provide a method and system for determining a reference coordinate system of a camera in relation to the real world coordinate system using a vertical direction which is determined either from the captured scene itself or using an external measurement device associated with the camera.

It is yet another object of the present invention to provide a method of circumventing low visibility of the ground in a scene.

It is a yet further object of the invention to provide a system for improving and automating the calibration process between a camera coordinate system and the real world coordinate system by iteratively adjusting the camera so that at least one axis of the camera coordinate system is aligned with a plane defined by the real world coordinate system.

In accordance with a first aspect of the present invention, there is provided a method of calibrating a three-dimensional time-of-flight imaging system in a three-dimensional environment, the method comprising the steps of:

a) determining a reference orthonormal virtual three-dimensional coordinate system for the three-dimensional imaging system, the reference orthonormal virtual three-dimensional coordinate system having horizontal, vertical and depth axes in which the horizontal axis and the vertical axis are respectively aligned with the horizontal and vertical axes of a sensor in the three-dimensional imaging system with the depth axis being orthonormal to the plane of the sensor defined by its horizontal and vertical axes;

b) obtaining a vertical direction of the real world in the virtual coordinate system;

c) determining with respect to the reference coordinate system a real three-dimensional orthonormal coordinate system having horizontal, vertical and depth axes in which the vertical axis is rotated to align it with respect to the vertical direction;

d) determining a point in the scene as a new origin for the real three-dimensional orthonormal coordinate system;

e) deriving a translation vector from the origin of the virtual three-dimensional coordinate system to the point defined as the new origin of the scene;

f) deriving a rotation matrix for transforming the virtual three-dimensional coordinate system into the real world three-dimensional orthonormal coordinate system; and g) deriving a calibration matrix for the three-dimensional imaging system as the rotation matrix translated by the translation vector; characterised in that the method further comprises the step of aligning a plane defined by the vertical and depth axes of the real world three-dimensional coordinate system to be coplanar with a plane defined by the virtual vertical axis and the virtual depth axis of the virtual three-dimensional coordinate system ($M_c$).

It will be appreciated that the term "three-dimensional imaging system" used herein also includes a three-dimensional camera for capturing a scene using a sensor.

The terms "real world coordinate system" and "virtual coordinate system" relate respectively to the world coordinate system and the camera coordinate system.

Additionally, an inverse calibration matrix may be derived from the calibration matrix.

The vertical direction of the real world may be derived as an opposite vector to a gravity vector determined using a measurement unit, for example, at least one inertial measurement device.

Alternatively, step b) may comprise deriving the vertical direction of the real world from a normal to a horizontal plane. The horizontal plane may be determined by the steps of:

i) capturing the scene with the three-dimensional imaging system in a first orientation;

ii) determining a plurality of planes within the scene using a plane fitting algorithm; and iii) determining a reference plane within the scene as being the ground.

By using a plane fitting algorithm to determine the horizontal plane, it is not necessary that the ground is visible during the calibration process.

In this case, iii) may comprise determining the reference plane as the one best satisfying at least one of: a statistical mode; the largest surface; and a minimum surface area.

Alternatively, step iii) may comprise determining the reference plane as a combination of: a statistical mode of the principal component analysis of the scene; the largest surface; and a minimum surface area.

In one embodiment, the step of determining the reference plane by satisfying a statistical mode comprises, for example, selecting among the plurality of planes: the one having a surface area greater than 1 m$^2$; the one having the lowest covariance value with respect to the normal of the plane; and the one being located at a distance greater than 1 m from the camera. It will be appreciated that other values for the surface area and distance from the camera may be used.

In an another alternative, step b) may comprise deriving the vertical direction of the real world from a specific user stance within the scene, the vertical direction being the direction that is aligned with the vertical direction of the user body standing in a predefined calibration posture.

In this alternative, the method may further comprise the step of deriving a horizontal axis and a vertical axis from the predefined calibration posture. In this case, the world three-dimensional coordinate system is aligned with the derived horizontal and vertical axes.

Naturally, a suitable object having a predefined posture or pose can be used instead of a user in a specific user stance for the determination of the vertical axis.

In a further embodiment, step b) comprises deriving the vertical direction of the real world from edges detected within the scene.

Step b) may further comprise refining the vertical direction by combining two or more of the steps of: deriving the vertical direction ($V_w$) of the real world as the opposite vector of a gravity vector determined using a measurement device; deriving the vertical direction ($V_w$) of the real world from a normal to a plane in the scene; deriving the vertical direction ($V_w$) of the real world from a specific user stance within the scene, the vertical direction ($V_w$) being the direction that is aligned with the vertical direction of the user standing in a predefined calibration posture; and deriving the vertical direction ($V_w$) of the real world from edges detected within the scene.

Step d) may comprise defining the point using one of: a predefined point in space; the lowest location of the points defining the user; a point on the ground; a point on a detected plane; and the location of a predetermined object within the scene.

The position of the camera may be determined with respect to the origin of the real coordinate system which is determined to be at the bottom of the position of a user or an object, or which is determined to be in a plane located in the scene. The position of the camera with respect to the real coordinate system may be determined manually or automatically.

In one embodiment, the method further comprises the step of automatically refining the calibration matrix if changes are detected in at least one of the position and the orientation of the three-dimensional imaging system with respect to the three-dimensional environment, at least one axis of the virtual coordinate system being aligned with a plane defined by two axes in the real coordinate system. Preferably, at least the vertical axis of the virtual coordinate system is aligned with the Z-Y plane, namely, the plane defined by the vertical axis and the depth axis, of the real world coordinate system by controlling a motorised system supporting the three-dimensional imaging system.

Ideally, the calibration matrix is stored in a memory. The calibration matrix is used to rectify camera measurements prior to signal processing. However, the calibration matrix may need to be updated if at least one of the camera position and camera orientation is changed. The position and orientation of the camera may be automatically modified using motorised means and the corresponding calibration matrix updated accordingly.

In accordance with another aspect of the present invention, there is provided a depth sensing imaging system having an inertial measurement unit, the depth sensing imaging system operating in accordance with the method as described above.

In accordance with a further aspect of the present invention, there is provided a depth sensing imaging system having motorised means for adjusting at least one of position and orientation of the depth sensing imaging system in accordance with the method as described above.

In accordance with yet another aspect of the present invention, there is provided a three-dimensional time of flight imaging system having calibration means operating in accordance with the method as described above.

BRIEF DESCRIPTION OF THE DRAWINGS

For a better understanding of the present invention, reference will now be made, by way of example only, to the accompanying drawings in which.

DESCRIPTION OF THE INVENTION

Figure 1:
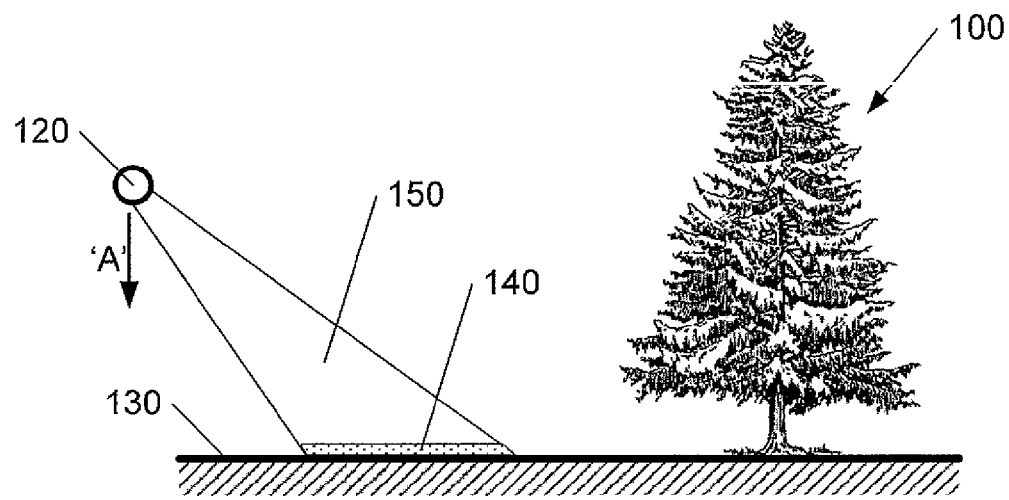
FIG. 1 illustrates a possible setup in accordance with the present invention where the camera is at least partially pointed towards the ground.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

It will be understood that the terms "vertical" and "horizontal" are used herein refer to particular orientations of the Figures and these terms are not limitations to the specific embodiments described herein.

The present invention relates to a method and a system for geometric calibration of machine vision. It more particularly concerns the calibration of a three-dimensional (3D) camera, and includes static and dynamic detection modes of the extrinsic camera parameters in order to improve the management and analysis of a captured scene. Such calibration includes the determination of a camera rotation and translation from the real world coordinate system.

In Euclidean geometry, a translation is an affine transformation that moves every point a constant distance in a specified direction. For a given point, P, its homogeneous vector, $\vec{p}$, can be written as:

$$\vec{p} = \begin{bmatrix} p_x \\ p_y \\ p_z \\ 1 \end{bmatrix}$$

A translation vector, $\vec{v}$, can also be written as:

$$\vec{v} = \begin{bmatrix} v_x \\ v_y \\ v_z \\ 1 \end{bmatrix}$$

The translation, $T_v$, for the point P can be expressed as:

$$T_v = \vec{p} + \vec{v} \Leftrightarrow T_v = \begin{bmatrix} 1 & 0 & 0 & v_x \\ 0 & 1 & 0 & v_y \\ 0 & 0 & 1 & v_z \\ 0 & 0 & 0 & 1 \end{bmatrix} \begin{bmatrix} p_x \\ p_y \\ p_z \\ 1 \end{bmatrix}$$

In Euclidean geometry, a rotation is a transformation that describes the motion of every point around a fixed point. For Euclidean spaces in three dimensions, rotations around the X-, Y- and Z-axes are respectively called yaw, pitch and roll. These rotations, R, can be represented by the following Eulerian matrices, where α, β and φ are the respective counter-clockwise rotation angles around their respective rotating axis:

$$R_x = \begin{bmatrix} 1 & 0 & 0 \\ 0 & \cos\alpha & -\sin\alpha \\ 0 & \sin\alpha & \cos\alpha \end{bmatrix}$$

$$R_y = \begin{bmatrix} \cos\beta & 0 & \sin\beta \\ 0 & 1 & 0 \\ -\sin\beta & 0 & \cos\beta \end{bmatrix}$$

$$R_z = \begin{bmatrix} \cos\varphi & -\sin\varphi & 0 \\ \sin\varphi & \cos\varphi & 0 \\ 0 & 0 & 1 \end{bmatrix}$$

A calibration matrix, C, can embed both rotation and translation, and as an example, such a matrix can be derived as follows:

$$C = R_x * R_y * R_z * T_v$$

This corresponds to the homogeneous product of:

$$C = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \begin{bmatrix} \cos\beta & 1 & \sin\beta & 0 \\ 0 & 1 & 0 & 0 \\ -\sin\beta & 0 & \cos\beta & 0 \\ 0 & 0 & 0 & 1 \end{bmatrix} \begin{bmatrix} \cos\varphi & -\sin\varphi & 0 & 0 \\ \sin\varphi & \cos\varphi & 0 & 0 \\ 0 & 0 & 1 & 0 \\ 0 & 0 & 0 & 1 \end{bmatrix} \begin{bmatrix} 1 & 0 & 0 & v_x \\ 0 & 1 & 0 & v_y \\ 0 & 0 & 1 & v_z \\ 0 & 0 & 0 & 1 \end{bmatrix}$$

In accordance with one embodiment, a 3D inertial measurement unit, namely, a 3D accelerometer is coupled to a 3D depth sensing system so that it provides at least one reference direction, namely, a vertically-downward direction due to the effect of gravity. The 3D accelerometer may be mounted external to the camera body or may be mounted internal to the camera body, and generates data collected by a computerised system, the computerised system also processing data generated by the camera device. From such a 3D accelerometer, it is possible to extract the acceleration on any given axis. If the camera is still, that is, the scene is relatively stable during a predetermined number of frames, it is possible to determine a maximum acceleration direction mode. This mode provides a gravity vector which corresponds to an opposite vector to the ground normal vector.

If the ground or floor is to be used for determining the vertical direction, no user interaction is required. Here, as soon as a surface corresponding to the ground or the floor is detected, the vertical direction can be determined as being a direction that is normal to the horizontal plane which defines the ground or the floor. However, it will be appreciated that this mode of determining the vertical direction can only be used when the floor is visible.

The determination of the centre or origin of the real world coordinate system is chosen to be, for example, on the ground at a fixed distance of 2.5 m away from the camera if visible. Naturally, this position can be chosen to be at any suitable distance or location. The parameter settings are stored for future use and the variables associated with the camera position and/or orientation are updated, that is, the position vector, as well as yaw, pitch and roll.

In one embodiment of the present invention, the method first obtains the gravity vector and then uses it in order to find the virtual orientation and offset of a camera with respect to the scene captured by the camera. This will be described with reference to FIGS. 1 and 2 below.

Figure 2:
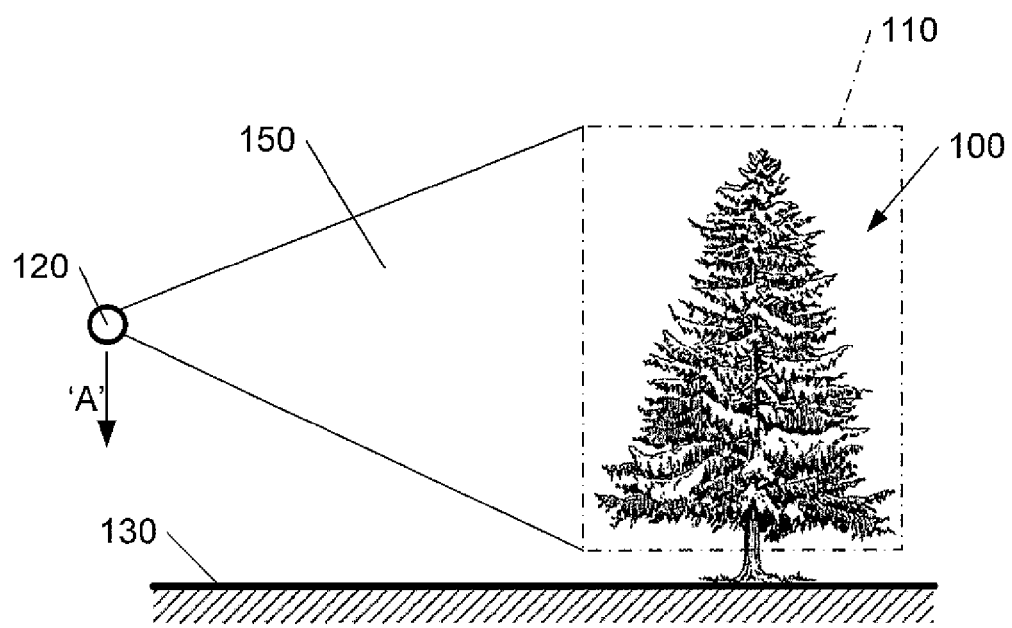
FIG. 2 illustrates another possible setup in accordance with the present invention where the camera has a different position and orientation with respect to the scene.

In accordance with one embodiment of the present invention, it is desired to capture an object, namely, branches of a tree 100, as part of a scene as indicated by rectangle 110 in FIG. 2, using a time-of-flight (TOF) or three-dimensional (3D) camera 120. However, before the scene 110 can be captured, the camera 120 needs to be calibrated so that its orientation and position with respect to the scene 110 can be determined and then used to compensate in the captured image (not shown).

The camera 120 is mounted in a fixed position as shown in FIG. 1. Here, the camera 120 is pointed towards the ground 130. The camera 120 includes a three-axis motorised support system (not shown) which allows remote control orientation thereof. Here, the scene 140 within a viewing frustum 150 of the camera 120 comprises a portion of the ground. The viewing frustum 150 comprises a three-dimensional region visible on a camera sensor array (not shown)

and is determined by the angle which is viewed by the camera 120. In this position, the accelerometer (not shown) indicates the gravity vector as pointing in the direction of arrow 'A'.

Figure 6:
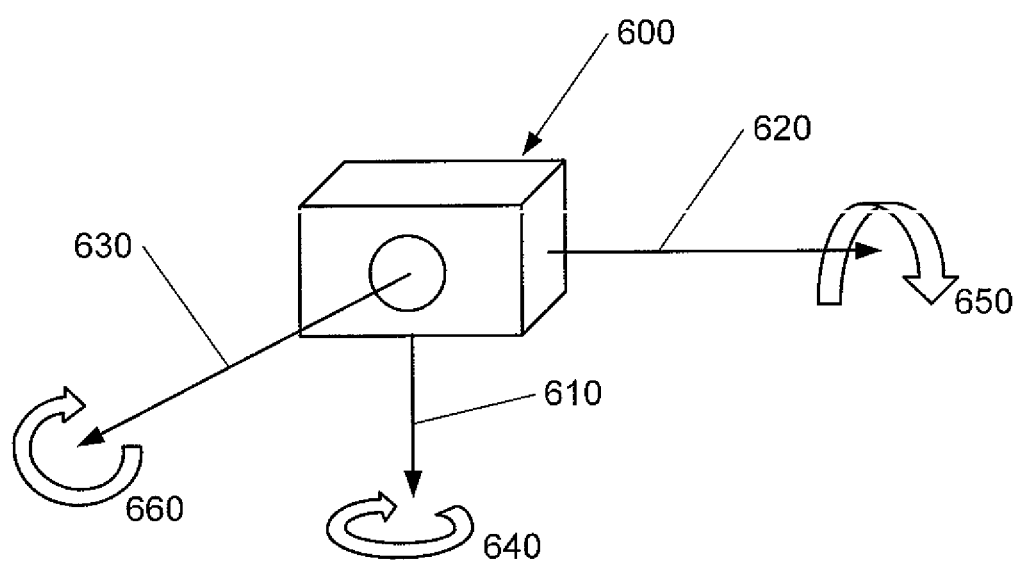
FIG. 6 illustrates a schematic view of a 3D camera device illustrating camera orientation roll, pitch and yaw axes.

Turning now to FIG. 6, a three-axis representation of a 3D camera device 600 is shown. The 3D camera device 600 has a vertical axis 610, a lateral axis 620, and a longitudinal axis 630. Movement about the vertical axis 610 corresponds to yaw; movement about the lateral axis 620 corresponds to pitch; and movement about the longitudinal axis 630 corresponds to roll. Yaw, pitch and roll are indicated by respective arrows 640, 650 and 660.

Although shown as being generally vertical in FIG. 6, the axis 610 of the camera device 600 may be angled with respect to the true vertical in the scene. Similarly, axis 620 may be angled in the opposite direction.

Each 3D data point in a scene captured by the camera device 600 has virtual coordinates ($X_c$, $Y_c$, $Z_c$) in the camera or virtual coordinate system which can be set as a reference. These 3D data points acquired by the camera can be projected onto any plane embedding the gravity vector as described above with reference to FIGS. 1 and 2. An embedding plane includes the centre position of the camera, for example, the origin point (0, 0, 0) of the virtual coordinate system; the gravity vector; and any other non co-linear normal vector.

The 2D image obtained by the projection shows strong edges for any 3D surface perpendicular to the vertical direction.

Returning to FIGS. 1 and 2, following arrow 'A', that is, the gravity vector, the lowest linear edge corresponds to a potential ground vector. A ground vector is part of a ground plane. By successive iterative projections, from randomly generated virtual orthonormal bases using random, normalised, non co-linear vectors with respect to the vertical direction, different edges are obtained which can be considered to be possible non co-linear ground vectors.

A plane fitting algorithm is applied to these non co-linear normalised vectors to resolve them. A least-squares estimator may be used for this purpose. It is to be noted that in one other embodiment, a plane fitting is applied on the three-dimensional point cloud delivered by the three-dimensional camera to detect a plurality of planes. Following the gravity vector, the lowest plane with a minimal surface is defined as being the ground. Once the ground is found, the distance from the camera to the ground can be determined. Knowing the distance to the ground and the orientation of the ground with respect to the camera, a calibration matrix can be derived. The inverse calibration matrix can also be derived by inverting the calibration matrix.

Once this calibration matrix has been derived, a snapshot of the current direction of gravity can be obtained. This direction can be termed "snapshot gravity". Having determined the "snapshot gravity", the camera can be aligned to have a better view of the scene as shown in FIG. 2. Alignment of the camera 120 can be done manually by a user, or can be automated using a motor to move the camera 120 so as to provide the desired viewing frustum.

As shown in FIG. 2, it is not necessary for the ground 130 to be in a new viewing frustum 160 which encompasses the tree 100. Changes in the direction of gravity are tracked and differences are applied to the calibration matrix. These differences form the normalised inverse rotation from the snapshot to the current gravity direction. This ensures that the calibration matrix from the camera or virtual coordinate system to the world or real coordinate system can be correctly applied to the 3D image captured by the camera 120 prior to signal processing. Changes in the position of the camera can be tracked by detecting the translation vector through scene analysis or measurement.

It will be appreciated that, in accordance with this embodiment of the present invention, the scene does not need to contain a large visible part of the ground to be able to derive the calibration matrix.

A simplified calibration process is provided as no pattern is needed to derive the calibration matrix. In addition, there is no need for external assistance in performing the calibration as the user can easily perform the necessary steps as described above.

Figure 3:
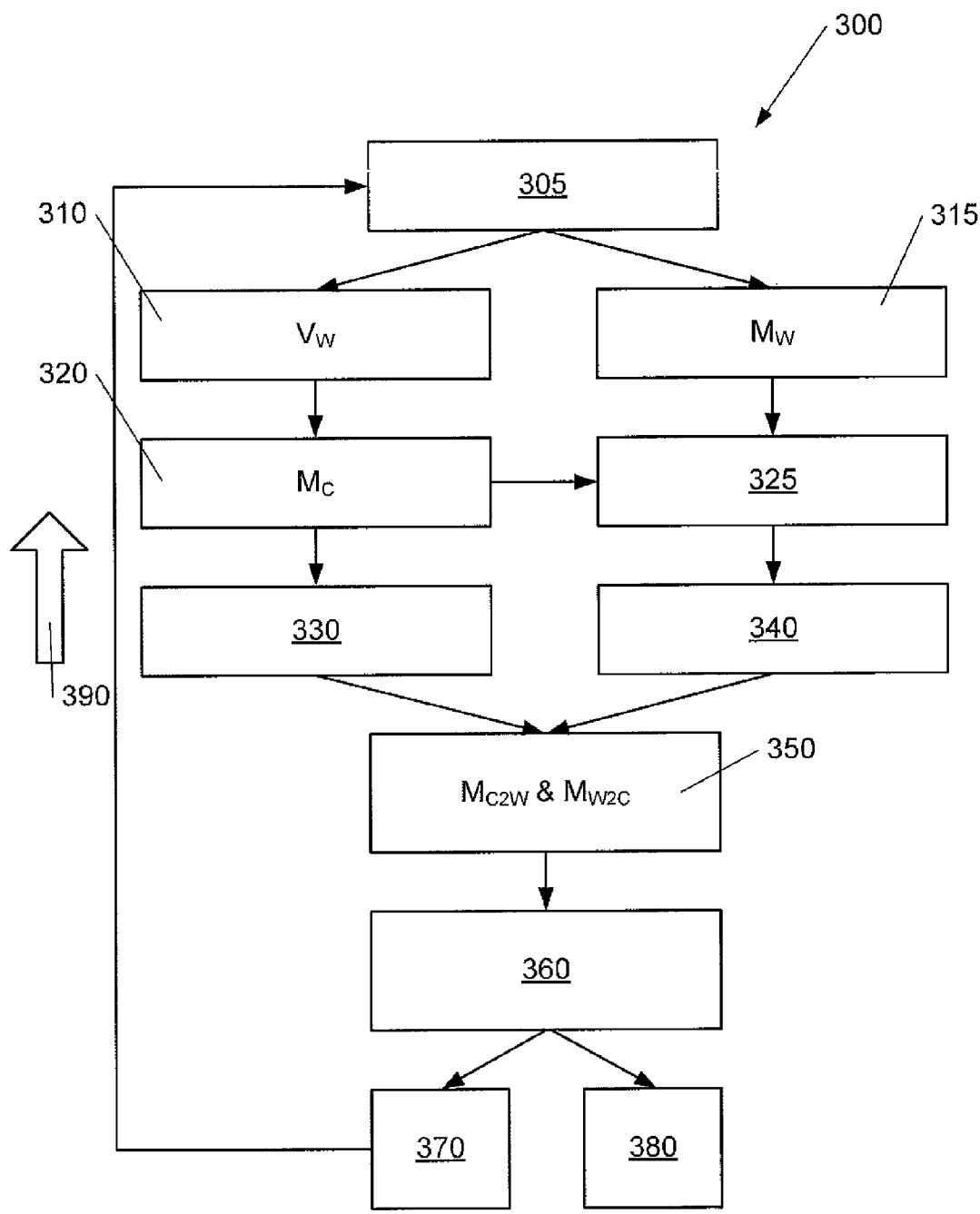
FIG. 3 illustrates a flow chart of one generic automatic calibration process in accordance with the present invention.

In FIG. 3, a flow chart 300 illustrating a generic auto-calibration process in accordance with the present invention is shown. The first step is to acquire depth images of a scene using a 3D camera, step 305. From the acquired image or an inertial sensing unit, in step 310, a vertical direction, $V_w$, in the scene is derived, and an origin for the real or world coordinate system is determined, step 315. From the derived vertical direction, Vw, an orthonormal coordinate system is used to create a reference 3D orthonormal coordinate system for the camera (step 320). This can be referred to as a virtual or camera coordinate system, $M_c$.

In step 325, the reference 3D orthonormal coordinate system is used to create a real or world 3D orthonormal coordinate system, Mw, aligned to the reference 3D coordinate system using the output from step 315, that is, the origin of the real or world coordinate system. In step 330, the camera orientation is determined, and in step 340, the camera position is determined. In step 340, the aligned real or world coordinate system is used as part of the camera position determination.

The camera orientation, obtained in step 330, and the camera position, obtained in step 340, are both used to derive a calibration matrix, $M_{c2w}$, for transforming the virtual or camera coordinate system, $M_c$, to the real or world coordinate system, $M_w$. Additionally, an inverse calibration matrix, $M_{w2c}$, can also be derived for converting from the real or world coordinate system, $M_w$, to the virtual or camera coordinate system, $M_c$, in step 350.

The calibration matrix, $M_{c2w}$, is used to rectify camera measurements before signal processing in step 360. The camera orientation and position is monitored in step 370 and, if either the orientation or position has changed, the calibration process is restarted at step 305, as indicated by arrow 390, so that an accurate correction is applied to the camera measurements before signal processing, step 380. If no changes have been made in the camera orientation and/or position, the rectified camera measurements can be passed for signal processing, step 380.

It will be appreciated that the camera set-up with respect to orientation and/or position is important to ensure that the correct calibration matrix is applied to the camera measurements before signal processing. As a result, the monitoring process in step 370 is performed continuously and the re-evaluation of the calibration matrix, $M_{c2w}$, and its inverse, $M_{w2c}$, are made as required.

In one embodiment, the step of determining the reference plane by satisfying a statistical mode comprises, for example, selecting among the plurality of planes: the one having a surface area greater than 1 $m^2$; the one having the lowest covariance value with respect to the normal of the plane; and the one being located at a distance greater than 1m from the camera. It will be appreciated that other values for the surface area and distance from the camera may be used.

It will be appreciated that determining the vertical direction of the scene may be obtained by using the normal direction of the reference plane. It will also be appreciated that the normal direction of the reference plane can be used for refining the vertical direction provided by an inertial measurement, and the vertical direction provided by an inertial measurement unit may also be used for determining the reference plane as being the one that as the most similar vertical direction among the plurality of planes detected.

In another embodiment, the vertical is determined from a user stance within the scene. Here, the user stands in the middle of the scene facing the 3D camera with his/her arms extended so that they form a T-shape with his/her legs. This is known as the "T-pose" calibration posture. After a predetermined time, for example, a few seconds, in the T-pose, the real world coordinates are evaluated based on the position and orientation of the user. In this case, the vertical direction is determined by a line passing from the head of the user to his/her feet, and the horizontal plane is defined as the normal to this vertical direction.

It will be appreciated that the camera system first detects the user, then detects the T-pose, and after the predetermined time, generates the calibration matrix which converts the virtual coordinate system of the camera to the real coordinate system of the real world. Parameter settings for the camera are stored for future use and the variables associated with camera position and/or orientation are updated, that is, the position relative to the X-, Y-, and Z-axes, as well as, yaw, pitch and roll.

Having determined the vertical direction and the horizontal plane, a point is chosen as the origin for the real world coordinate system and the calibration matrix is determined that maps the virtual coordinate system of the 3D camera onto the real world coordinate system. Each coordinate system comprises three orthogonal axes having a centre that is situated in a predefined 3D location at a predefined time, for example, at start-up of the imaging system or during a calibration process. The steps in this process will now be described in more detail with reference to FIG. 4.

Figure 4:
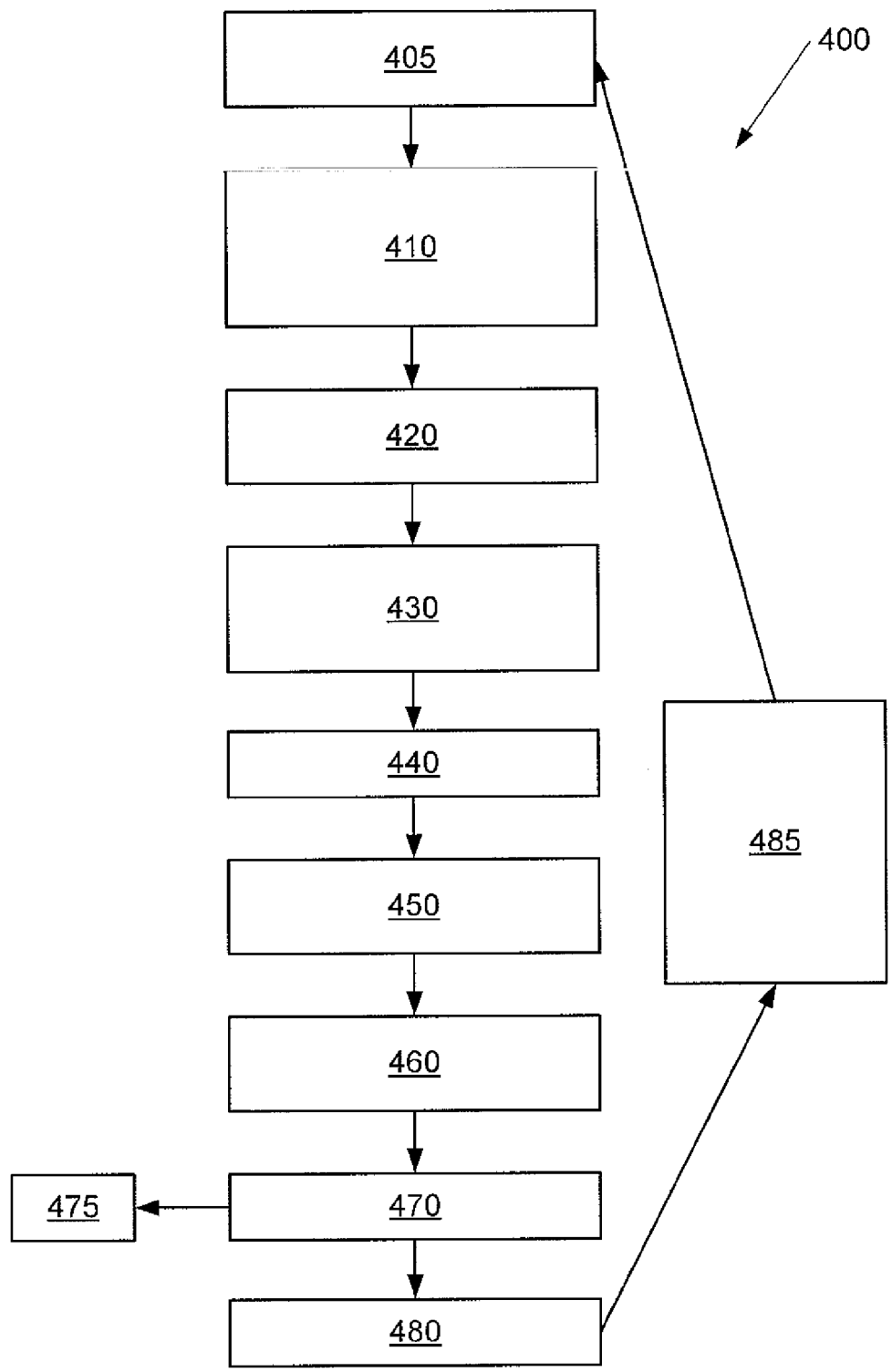
FIG. 4 illustrates a flow chart of a manual calibration process in accordance with the present invention in which a pose of a user is used to determine the vertical direction of the real world coordinate system in order to derive the calibration matrix.

In FIG. 4, a flow chart 400 is shown that illustrates a generic manual calibration process in which the stance of a user is used to determine the vertical direction. In step 405, depth images are acquired using a manually defined camera setup. In step 410, a principal direction of a user in a specific stance is determined and used as the world or real vertical direction. In this case, the specific stance may be a T-pose as described above. However, any other distinctive pose can be used.

Having determined the vertical direction, the world ground position at the position of the user is determined, step 420, and from that world ground position, an origin for the real or world coordinate system is determined, step 430. Whilst the determination of the ground position at the user and the origin at the user are shown as two separate steps, they may be combined in a single step.

From the origin, a reference world 3D orthonormal coordinate system and a reference 3D orthonormal coordinate system are created, step 440. The rotation and position of the camera with respect to the world or real coordinate system is determined, step 450, before the calibration matrix embedding camera or virtual to world or real rotation and translation are determined, step 460. Also in step 460, the inverse calibration matrix is also determined.

In step 470, the calibration matrix is used to rectify 3D points in the depth images before they are passed for signal processing in step 475. Calibration control is carried out in step 480, and if the calibration matrix is not correct, the position and/or orientation of the camera is changed in step 485 and the process is re-started at step 405. Having determined the origin of the world or real coordinate system, plane fitting techniques are utilised to identify planes in the scene. One possible plane fitting technique is region growing. Once these planes have been identified, a reference plane is selected as being the lowest plane with a surface area greater than a threshold value of 2 m$^2$ in the scene and being orthogonal to the vertical direction determined by gravity is set as the reference plane onto which a reference point is automatically predetermined. The reference point is set at a distance of 2.5 m from the camera and is used as the origin of the world or real coordinate system.

Knowing camera orientation with respect to gravity and the distance with respect to the origin of the world or real coordinate system, the calibration matrix is then defined.

Additionally, in order to adjust the scene capture to the best and most useful frustum, that is, what the camera captures, iteration in the derivation of the calibration matrix is performed whilst adjusting the camera orientation using a three-axis motorised support and until a suitable field of view is obtained. For example, if the camera default orientation is pitched by 20° leading to cropping of the faces of users on one side of the acquired depth images, the camera orientation is iteratively adjusted and the corresponding calibration matrices determined until the horizontal axis of the camera becomes parallel to the real or world coordinate system axis and until the Z-axis of the camera becomes aligned with the Z-Y plane of the real or world coordinate system.

In a fully automated embodiment, the accelerometer is used to determine the vertical direction in the scene using a gravity determination as described above.

In another embodiment, the vertical direction is determined from edges in the depth map. These edges can be detected using any edge detection process, for example, a morphological operation, such as, Laplacian filters or Gaussian differences, or gradient edge detectors. Once the edges have been found, a statistical analysis may be performed over the proposed horizontal and vertical axes, that is, those being most representative in a natural scene, in order to determine the most probable vertical axes. These probable vertical axes may then be aggregated together to provide an estimate of one meaningful vertical direction.

Figure 5:
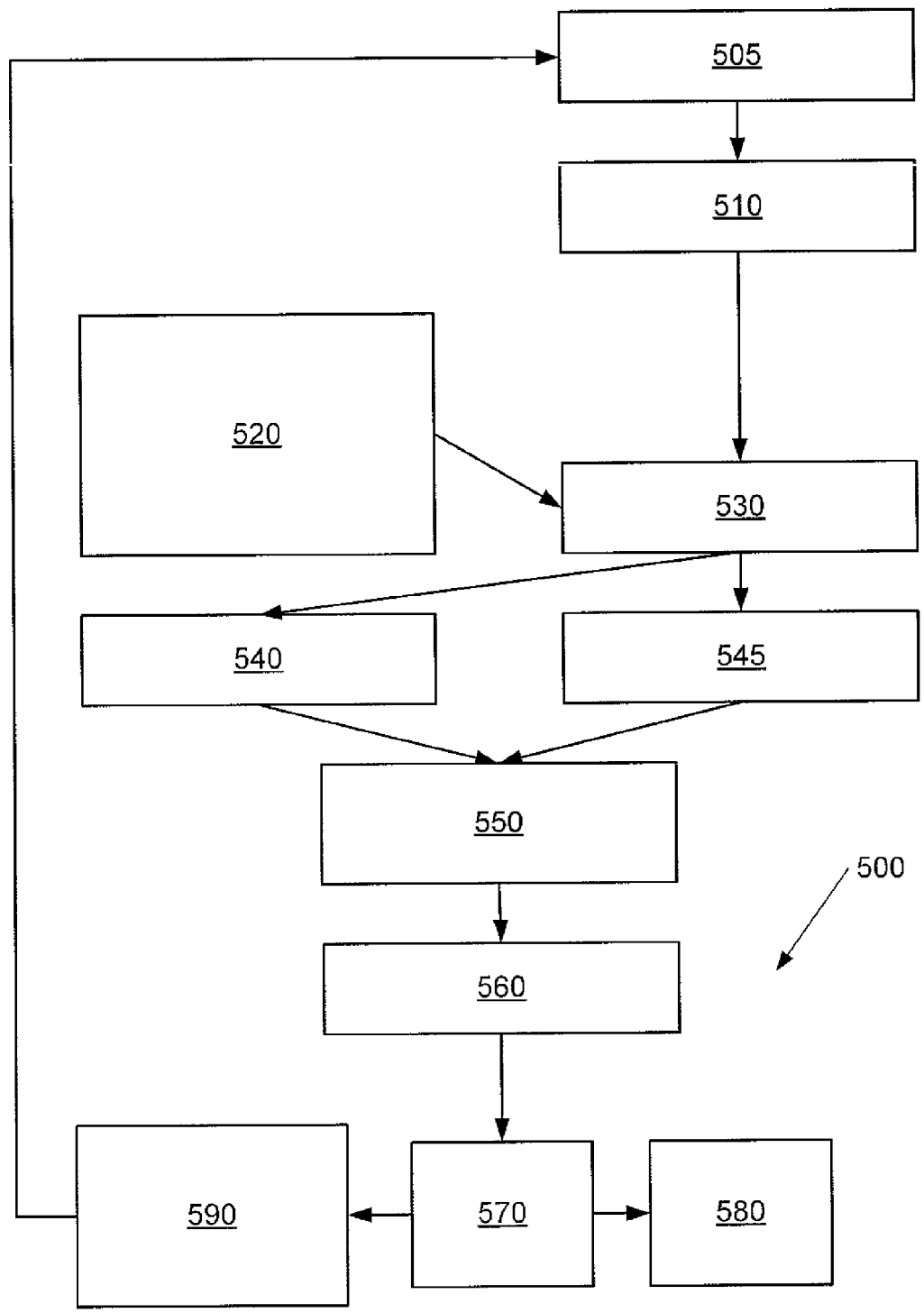
FIG. 5 illustrates a flow chart of an automatic calibration process using accelerometer measurements to determine a vertical direction of the real world and a motorised system for iteratively adjusting camera orientation to satisfy a preferred capturing setup.

In FIG. 5, a flow chart 500 is shown which illustrates an automatic calibration process including accelerometer measurements and using a three-axes motorised system for iteratively adjusting camera orientation. In a further embodiment, the camera position may also be adjusted using a robotised system. The first step, step 505, is to acquire depth images using a 3D camera. From the depth images, the lowest visible plane in the scene is detected, step 510. A world or real vertical direction is determined in step 520, using an inertial sensing unit associated with the 3D camera. As described above, the inertial sensing unit is preferably an accelerometer that can be mounted within the 3D camera or mounted on the camera. The world or real vertical direction is determined as the direction that is opposite to that of the gravity vector.

Having obtained the world or real vertical direction, an origin for a world or real 3D orthonormal coordinate system is determined in step 530. From this determination, the camera orientation, step 540, and the camera position, step 545, can be determined relative to the origin of the world or real 3D orthonormal coordinate system.

The camera orientation and position as determined in steps 540 and 545 respectively are then used to derive a calibration matrix for transforming the camera or virtual coordinate system to the world or real coordinate system, step 550. Also in step 550, an inverse calibration matrix is also determined.

The calibration matrix is then used to rectify camera measurements prior to signal processing in step 560. The camera setup with respect to position and orientation is monitored for any changes in step 570. If there are no changes, the rectified measurements can be passed for signal processing, step 580. If changes are detected, the camera is re-aligned using a three-axis motorised system, step 590, and the process re-started to obtain a new calibration matrix.

In one particular embodiment, the vertical axis of the camera may be re-aligned with the Y-Z plane axis of the real world coordinate system $M_w$.

Although not shown, the calibration matrix and its inverse matrix can be stored and applied to all camera measurements before signal processing provided the camera setup has not changed.

Whilst the present invention has been described with respect to specific embodiments, it will be appreciated that the present invention is not limited to these embodiments and it is possible to obtain the necessary information for the calibration matrix in other ways.

The invention claimed is:

1. A method of calibrating a three-dimensional time-of-flight imaging system in a three-dimensional environment, the method comprising the steps of:
    a) determining a reference orthogonal virtual three-dimensional coordinate system for the three-dimensional imaging system, the reference orthogonal virtual three-dimensional coordinate system having horizontal, vertical and depth axes in which the horizontal axis and the vertical axis are respectively aligned with the horizontal and vertical axes of a sensor in the three-dimensional imaging system with the depth axis being orthonormal to the plane of the sensor defined by its horizontal and vertical axes;
    b) obtaining a vertical direction of the real world in the virtual coordinate system;
    c) determining with respect to the reference coordinate system a real world three-dimensional orthonormal coordinate system having horizontal, vertical and depth axes in which the vertical axis is rotated to align it with respect to the vertical direction;
    d) determining a point in the scene as a new origin for the real world three-dimensional orthonormal coordinate system;
    e) deriving a translation vector from the origin of the virtual three-dimensional coordinate system to the point defined as the new origin of the scene;
    f) deriving a rotation matrix for transforming the virtual three-dimensional coordinate system into the real world three-dimensional coordinate system;
    g) deriving a calibration matrix ($M_{c2w}$) for the three-dimensional imaging system as the rotation matrix translated by the translation vector;
    h) aligning a plane defined by the vertical and depth axes of the real world three-dimensional coordinate system to be coplanar with a plane defined by the virtual vertical axis and the virtual depth axis of the virtual three-dimensional coordinate system; and
    i) automatically refining the calibration matrix if changes are detected in at least one of:
        the position and the orientation of the three-dimensional imaging system with respect to the three-dimensional environment.

2. A method according to claim 1, wherein step g) further comprises deriving an inverse calibration matrix from the calibration matrix for transforming the real world three-dimensional coordinate system into the virtual three-dimensional coordinate system.

3. A method according to claim 1, wherein step b) comprises deriving the vertical direction of the real world as the opposite vector of a gravity vector determined using a measurement device, the measurement device comprising at least one inertial measurement unit.

4. A method according to claim 1, wherein step
    b) comprises deriving the vertical direction of the real world from a normal to a plane in the scene, the plane in the scene being determined by the steps of:
        i) capturing the scene with the three-dimensional imaging system in a first orientation;
        ii) determining a plurality of planes within the scene using a plane fitting algorithm; and
        iii) determining a reference plane within the scene as being the ground.

5. A method according to claim 4, wherein step iii) comprises determining the reference plane as one best satisfying:
    a statistical mode;
    the largest surface; and
    a minimum surface area.

6. A method according to claim 4, wherein step iii) comprises determining the reference plane as a combination of: a statistical mode of the principal component analysis of the scene; the largest surface; and a minimum surface area.

7. A method according to claim 1, wherein step b) comprises deriving the vertical direction of the real world from a specific user stance within the scene, the vertical direction being the direction that is aligned with the vertical direction of a user standing in a predefined calibration posture.

8. A method according to claim 7, further comprising the steps of deriving a horizontal axis and a vertical axis from the predefined calibration posture, and aligning the real world three-dimensional coordinate system with the derived horizontal and vertical axes.

9. A method according to claim 1, wherein step
    b) comprises deriving the vertical direction of the real world from edges detected within the scene.

10. A method according to claim 1, wherein step b) comprises refining the vertical direction by combining two or more of the steps of:
    deriving the vertical direction of the real world as the opposite vector of a gravity vector determined using a measurement device;
    deriving the vertical direction of the real world from a normal to a plane in the scene;
    deriving the vertical direction of the real world from a specific user stance within the scene, the vertical direction being the direction that is aligned with the vertical direction of a user standing in a predefined calibration posture; and
    deriving the vertical direction of the real world from edges detected within the scene.

11. A method according to claim 1, wherein step d) comprises defining the point for the new origin using one of:
    a predefined point in space;
    the lowest location of the points defining a user;
    a point on a detected plane; and
    the location of a predetermined object within the scene.

12. A method according to claim 1, further comprising the step of aligning at least the vertical axis of the virtual coordinate system with the Y-Z plane of the real world coordinate system by controlling a motorised system supporting the three-dimensional imaging system.

13. A depth sensing imaging system having inertial measurement unit, the depth sensing imaging system operating in accordance with a method according to claim 1 comprising the steps of:
   a) determining a reference orthogonal virtual three-dimensional coordinate system for the three-dimensional imaging system, the reference orthogonal virtual three-dimensional coordinate system having horizontal, vertical and depth axes in which the horizontal axis and the vertical axis are respectively aligned with the horizontal and vertical axes of a sensor in the three-dimensional imaging system with the depth axis being orthonormal to the plane of the sensor defined by its horizontal and vertical axes;
   b) obtaining a vertical direction of the real world in the virtual coordinate system:
   c) determining with respect to the reference coordinate system a real world three-dimensional orthonormal coordinate system having horizontal, vertical and depth axes in which the vertical axis is rotated to align it with respect to the vertical direction;
   d) determining a point in the scene as a new origin for the real world three-dimensional orthonormal coordinate system;
   e) deriving a translation vector from the origin of the virtual three-dimensional coordinate system to the point defined as the new origin of the scene
   f) deriving a rotation matrix for transforming the virtual three-dimensional coordinate system into the real world three-dimensional coordinate system;
   g) deriving a calibration matrix for the three-dimensional imaging system as the rotation matrix translated by the translation vector;
   h) aligning a plane defined by the vertical and depth axes of the real world three-dimensional coordinate system to be coplanar with a plane defined by the virtual vertical axis and the virtual depth axis of the virtual three-dimensional coordinate system; and
   i) automatically refining the calibration matrix if changes are detected in at least one of: the position and the orientation of the three-dimensional imaging system with respect to the three-dimensional environment.

14. A depth sensing imaging system having motorised means for adjusting at least one of: position and orientation of the depth sensing imaging system in accordance with operation of a method comprising the steps of:
   a) determining a reference orthogonal virtual three-dimensional coordinate system for the three-dimensional imaging system, the reference orthogonal virtual three-dimensional coordinate system having horizontal, vertical and depth axes in which the horizontal axis and the vertical axis are respectively aligned with the horizontal and vertical axes of a sensor in the three-dimensional imaging system with the depth axis being orthonormal to the plane of the sensor defined by its horizontal and vertical axes;
   b) obtaining a vertical direction of the real world in the virtual coordinate system:
   c) determining with respect to the reference coordinate system a real world three-dimensional orthonormal coordinate system having horizontal, vertical and depth axes in which the vertical axis is rotated to align it with respect to the vertical direction;
   d) determining a point in the scene as a new origin for the real world three-dimensional orthonormal coordinate system;
   e) deriving a translation vector from the origin of the virtual three-dimensional coordinate system to the point defined as the new origin of the scene;
   f) deriving a rotation matrix for transforming the virtual three-dimensional coordinate system into the real world three-dimensional coordinate system;
   g) deriving a calibration matrix for the three-dimensional imaging system as the rotation matrix translated by the translation vector;
   h) aligning a plane defined by the vertical and depth axes of the real world three-dimensional coordinate system to be coplanar with a plane defined by the virtual vertical axis and the virtual depth axis of the virtual three-dimensional coordinate system; and
   i) automatically refining the calibration matrix if changes are detected in at least one of: the position and the orientation of the three-dimensional imaging system with respect to the three-dimensional environment.

15. A three-dimensional time of flight imaging system having calibration means operating in accordance with a method comprising the steps of:
   a) determining a reference orthogonal virtual three-dimensional coordinate system for the three-dimensional imaging system, the reference orthogonal virtual three-dimensional coordinate system having horizontal, vertical and depth axes in which the horizontal axis and the vertical axis are respectively aligned with the horizontal and vertical axes of a sensor in the three-dimensional imaging system with the depth axis being orthonormal to the plane of the sensor defined by its horizontal and vertical axes;
   b) obtaining a vertical direction of the real world in the virtual coordinate system:
   c) determining with respect to the reference coordinate system a real world three-dimensional orthonormal coordinate system having horizontal, vertical and depth axes in which the vertical axis is rotated to align it with respect to the vertical direction;
   d) determining a point in the scene as a new origin for the real world three-dimensional orthonormal coordinate system;
   e) deriving a translation vector from the origin of the virtual three-dimensional coordinate system to the point defined as the new origin of the scene;
   f) deriving a rotation matrix for transforming the virtual three-dimensional coordinate system into the real world three-dimensional coordinate system;
   g) deriving a calibration matrix for the three-dimensional imaging system as the rotation matrix translated by the translation vector;
   h) aligning a plane defined by the vertical and depth axes of the real world three-dimensional coordinate system to be coplanar with a plane defined by the virtual vertical axis and the virtual depth axis of the virtual three-dimensional coordinate system; and
   i) automatically refining the calibration matrix if changes are detected in at least one of: the position and the orientation of the three-dimensional imaging system with respect to the three-dimensional environment.

* * * * *